(No Model.) 2 Sheets—Sheet 1.
J. W. & M. F. BRINKLEY.
DITCHING MACHINE.
No. 361,670. Patented Apr. 26, 1887.
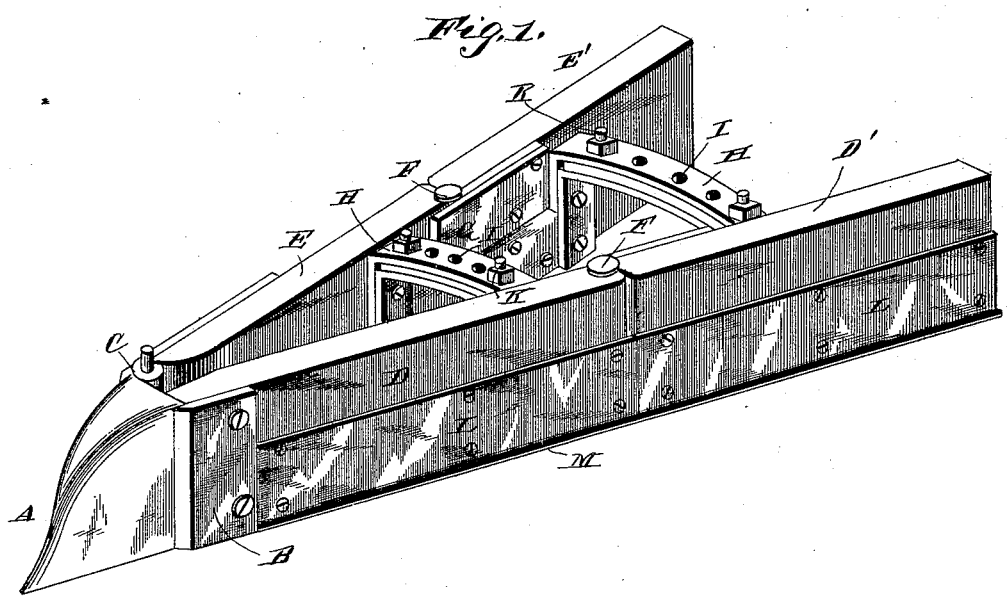
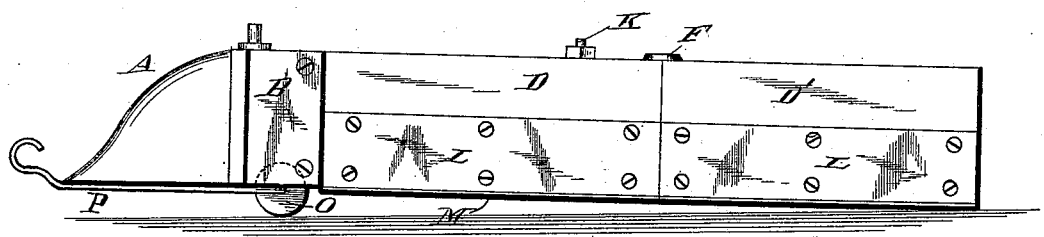
Witnesses
Inventors
James W. Brinkley
Milton F. Brinkley
By their Attorneys
N. PETERS, Photo-Lithographer, Washington, D. C.

(No Model.) 2 Sheets—Sheet 2.
J. W. & M. F. BRINKLEY.
DITCHING MACHINE.
No. 361,670. Patented Apr. 26, 1887.
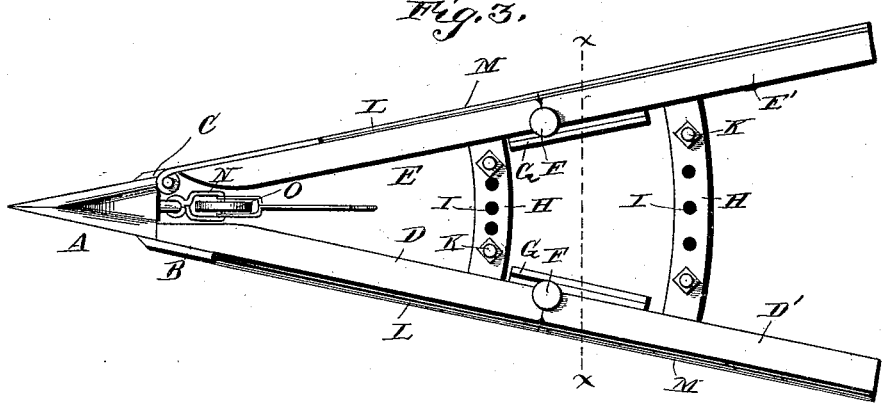
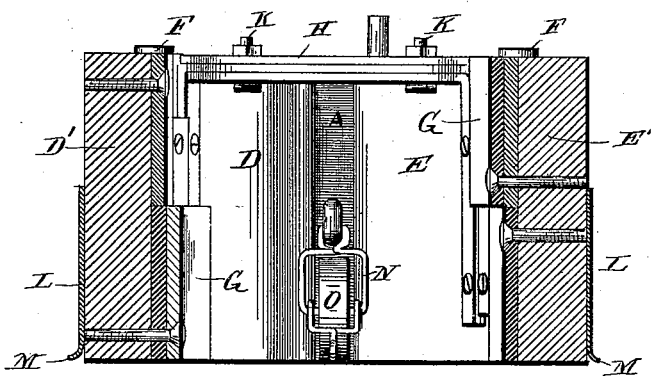

UNITED STATES PATENT OFFICE.

JAMES WM. BRINKLEY AND MILTON FRISBY BRINKLEY, OF BERTHOUD, COL.

DITCHING-MACHINE.

SPECIFICATION forming part of Letters Patent No. 361,670, dated April 26, 1887.

Application filed October 29, 1886. Serial No. 217,524. (No model.)

*To all whom it may concern:*

Be it known that we, JAMES WM. BRINKLEY and MILTON FRISBY BRINKLEY, citizens of the United States, residing at Berthoud, in the county of Larimer and State of Colorado, have invented a new and useful Improvement in Ditching-Machines, of which the following is a specification.

Our invention relates to an improvement in ditching-machines; and it consists in the peculiar construction and combination of devices, that will be more fully set forth hereinafter, and particularly pointed out in the claims.

In the drawings, Figure 1 is a perspective view of a ditching-machine embodying our improvements. Fig. 2 is a side elevation of the same, showing the front end of the machine raised above the ground, and thus adapted for transportation along a road. Fig. 3 is a top plan view. Fig. 4 is a transverse sectional view taken on the line $x\ x$ of Fig. 3.

A represents the wedge-shaped point or share of the ditcher, which is provided on its rear end, at one side, with a rearwardly-extending wing, B.

It will be seen from Figs. 1 and 3 that this point is wedge-shaped in both side and plan view, thereby providing a broad top and a gradually-inclined forward edge, the result of which construction is that the dirt will be thrown positively to each side and will be prevented from falling over the rear of the point into the ditch. On the opposite side of the rear end of the point or share is attached a rearwardly-extending hinge C.

D represents one side of the ditcher, which is made of wood and has its front end bolted to the inner side of the wing B. The opposite side, E, of the ditcher is also made of wood, and has its front end secured on the inner side of the hinge C. The sides D and E are provided with rear extensions, D' and E', respectively, which are hinged to the sides by means of hinges F. The said hinges are provided on their inner sides with tongues G, that extend forwardly and are adapted to bear against the opposing sides of the sides D and E, so as to prevent the extensions D' and E' from being turned inwardly out of line with the sides D and E.

H represents curved arms, which extend inwardly from the opposing sides of the ditcher, and are provided with the longitudinal series of openings I and with bolts K, to extend through the said openings and thus secure the arms H together and cause the latter to secure the sides D and E at any desired distance apart, according to the width of the ditch to be excavated. The lower outer sides of the ditcher are sheathed with iron or steel plates L, having outwardly-extending flanges M at their lower edges.

The operation of our invention is as follows: In order to dig an irrigating-ditch, a common turning-plow is first caused to make a furrow in the ground in the line of the proposed ditch, and the ditcher is then drawn in the said furrow after the plow. This ditcher, being wedge-shaped, throws the dirt to the banks of the ditch, and the operation of first turning the furrow and then drawing the ditcher along the same is repeated until the ditch is finished or satisfaction obtained.

In order to enable the ditcher to be drawn along a road or across a field without plowing a furrow in the same, we provide a caster, N, which is pivoted to the rear side of the point or share between the converging front ends of the sides. This caster is adapted to be swung rearwardly, and thereby raised or lowered, and has in its lower end a supporting wheel or roller, O. A draft-rod, P, is attached to the caster. When the caster is caused to assume a vertical position, the supporting-wheel bears upon the ground and raises the front end or point of the ditcher above the same, and the draft-animals are then attached to the draft-rod.

Having thus described our invention, we claim—

1. In a ditching machine, the combination of the wedge-shaped point A, having the rearwardly-extending wing B on one side and the hinge C on the opposite side, with the side D, having its front end attached to the inner side of the wing B, the side E, having its front end attached to the hinge C, and the arms H, to support the sides at any desired distance apart, substantially as described.

2. In a ditching-machine, the combination of the wedge-shaped point A, having the rearwardly-extending diverging sides D and E, the caster N, pivoted to the rear side of the point between the sides and adapted to swing vertically, the roller or wheel O, journaled in the caster, and the draft-rod P, attached to the said caster, for the purpose set forth, substantially as described.

3. A ditcher having the point or share A and the vertically-adjustable supporting wheel or roller upon the rear side of the same in the medial line of the ditcher, for the purpose set forth, substantially as described.

4. A ditcher having the wedge-shaped share or point A, the diverging sides secured to and extending rearwardly from the share or point, and the supporting wheel or roller secured upon the rear side of the share or point midway between the sides, substantially as set forth.

5. The combination, with the share or point, of the sides D E, secured to the rear of the share or point and adjustable relative to each other, and the wings D' E', secured, respectively, to the sides D E and adjustable with respect to each other independently of the said sides, substantially as set forth.

In testimony that we claim the foregoing as our own we have hereto affixed our signatures in presence of two witnesses.

JAMES WM. BRINKLEY.
MILTON FRISBY BRINKLEY.

Witnesses:
 JOHN A. BOWMAN,
 GEORGE W. GRAHAM.